(12) United States Patent
Shows et al.

(10) Patent No.: US 10,545,568 B2
(45) Date of Patent: Jan. 28, 2020

(54) MODIFIED SLEEP STATE GRAPHICS PROCESSING SYSTEM

(71) Applicant: Dekll Products L.P., Round Rock, TX (US)

(72) Inventors: Thomas Alexander Shows, Cedar Park, TX (US); Chung Shou Wu, Taipei (TW)

(73) Assignee: Dell Products L.P., Round Rock, TX (US)

( * ) Notice: Subject to any disclaimer, the term of this patent is extended or adjusted under 35 U.S.C. 154(b) by 6 days.

(21) Appl. No.: 15/881,451

(22) Filed: Jan. 26, 2018

(65) Prior Publication Data
US 2019/0235615 A1    Aug. 1, 2019

(51) Int. Cl.
*G06F 1/3293*    (2019.01)
*G06T 1/20*    (2006.01)

(52) U.S. Cl.
CPC ............ *G06F 1/3293* (2013.01); *G06T 1/20* (2013.01)

(58) Field of Classification Search
CPC ................................ G06F 1/3293; G06T 1/20
See application file for complete search history.

(56) References Cited

U.S. PATENT DOCUMENTS

| | | | | |
|---|---|---|---|---|
| 2007/0234084 | A1* | 10/2007 | Furuta | G06F 1/3228 713/300 |
| 2012/0324248 | A1* | 12/2012 | Schluessler | G06F 1/3253 713/300 |
| 2014/0270722 | A1* | 9/2014 | Wang | H04N 21/4436 386/355 |
| 2016/0381638 | A1* | 12/2016 | Min | H04W 52/0235 370/311 |
| 2017/0344095 | A1* | 11/2017 | Hashimoto | G06F 1/3228 |

* cited by examiner

*Primary Examiner* — Maurice L. McDowell, Jr.
*Assistant Examiner* — Donna J. Ricks
(74) *Attorney, Agent, or Firm* — Haynes and Boone, LLP

(57) ABSTRACT

A modified sleep state graphics processing system includes a graphics processing system coupled to a central processing system that is configured to enter different sleep states. A power management engine coupled to the graphics processing system and the central processing system determines that the graphics processing system is operating above a graphics processing activity threshold and, in response, prevents the central processing system from entering a first subset of the different sleep states. The central processing system is configured to communicate with the graphics processing system to cause the graphics processing system to render graphics while prevented from entering the first subset of the different sleep states. The power management engine may then determine that the graphics processing system is operating below the graphics processing activity threshold and, in response, allow the central processing system to enter the first subset of the different sleep states.

17 Claims, 12 Drawing Sheets

MODIFIED SLEEP STATE GRAPHICS PROCESSING SYSTEM

BACKGROUND

The present disclosure relates generally to information handling systems, and more particularly to enhancing graphics processing in an information handling system by dynamically and automatically modifying the sleep states available to a Central Processing Unit (CPU) in the information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems such as, for example, gaming devices and other graphics-intensive computing devices, include discrete Graphics Processing Units (GPUs) that are separate from the Central Processing Units (CPUs) in those computing devices and that are used to render graphics for display on those computing devices. However, it has been found that the performance of such GPUs is often constrained by the ability of its CPU(s) to quickly provide instructions and data to the GPU so that graphics may be rendered at a relatively high number of frames per second, which is a measure of how "smoothly" the GPU is able to render or otherwise provide a scene for display via real-time graphics processing. Specifically, CPUs typically utilize sleep states (also called "performance" states) that operate to reduce the functionality and/or use of the CPU in order to conserve battery life, but it has been found that entering into particular sleep states can reduce the graphics performance of the computing device.

For example, a CPU may provide first instructions/data to the GPU for rendering, and then enter a sleep state during an idle time in which the GPU renders graphics according to those first instructions/data, with conventional high power CPUs entering as deep as possible a sleep state in order to conserve the maximum amount of power. However, the next time the display of graphics on the computing device needs to be updated, the CPU must then wake from that sleep state in order to provide second instructions/data to the GPU for rendering that update, and the time needed to perform such a wake operation may be substantial depending on how deep a sleep state the CPU entered. It has been found that this time needed to wake the CPU so that the second instructions/data may be provided to the GPU can have a measurable impact on the frames per second rendered by the GPU, which translates into a degradation in the user perception of the displayed graphics. One solution to such issues is to entirely disable the sleep capability of the CPU, but such solutions introduce negative effects to the battery life of the computing device, as well as to the ability of some CPUs to enter a top turbo frequency and/or satisfy the idle power requirements defines for energy conservation certifications.

Accordingly, it would be desirable to provide an improved graphics processing system.

SUMMARY

According to one embodiment, an Information Handling System (IHS) includes a processing system; and a memory system that is coupled to the processing system and that includes instructions that, when executed by the processing system, cause the processing system to: determine that a Graphics Processing Unit (GPU) is operating above a GPU activity threshold; prevent, in response to determining that the GPU is operating above the GPU activity threshold, a Central Processing Unit (CPU) from entering a first subset of a plurality of different sleep states available to the CPU, wherein the CPU communicates with the GPU to cause the GPU to render graphics while prevented from entering the first subset of the plurality of different sleep states; determine that the GPU is operating below the GPU activity threshold; and allow, in response to determining that the GPU is operating below the GPU activity threshold, the CPU to enter the first subset of the plurality of different sleep states

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
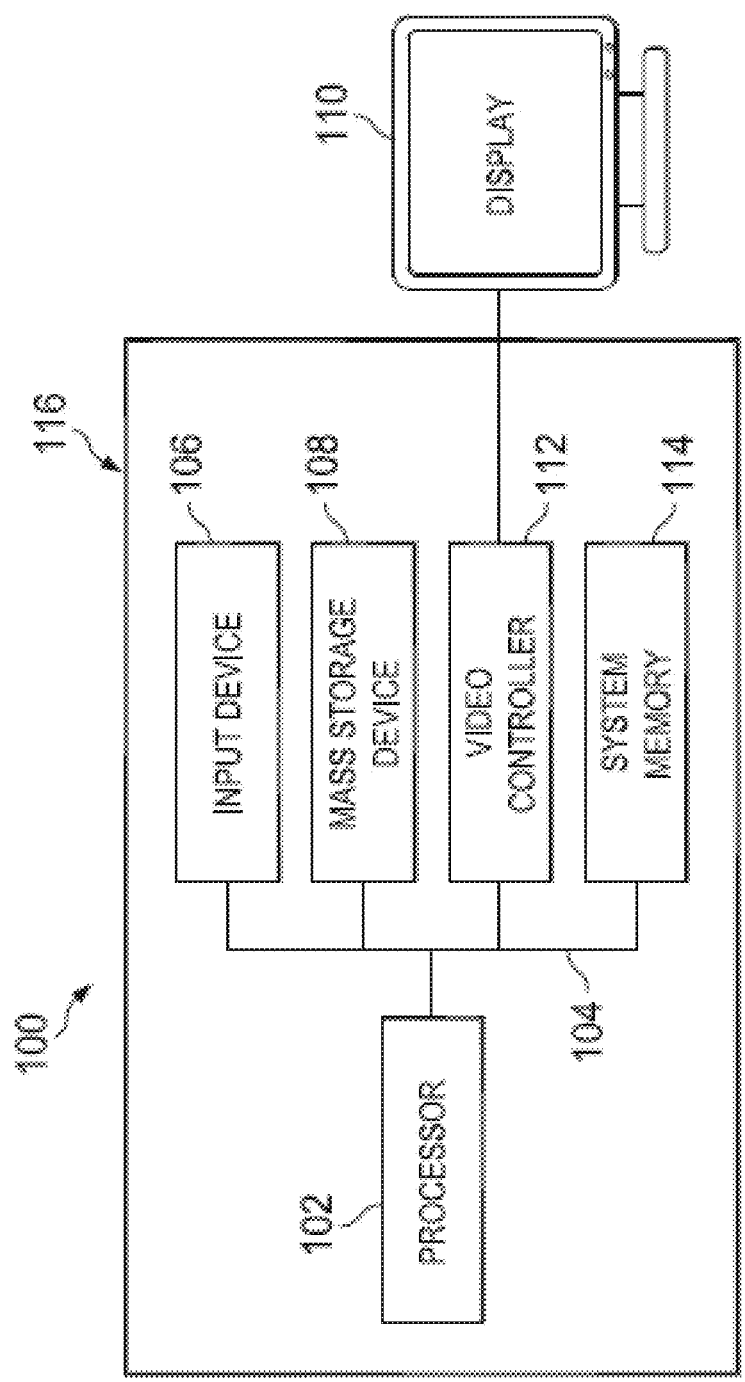
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
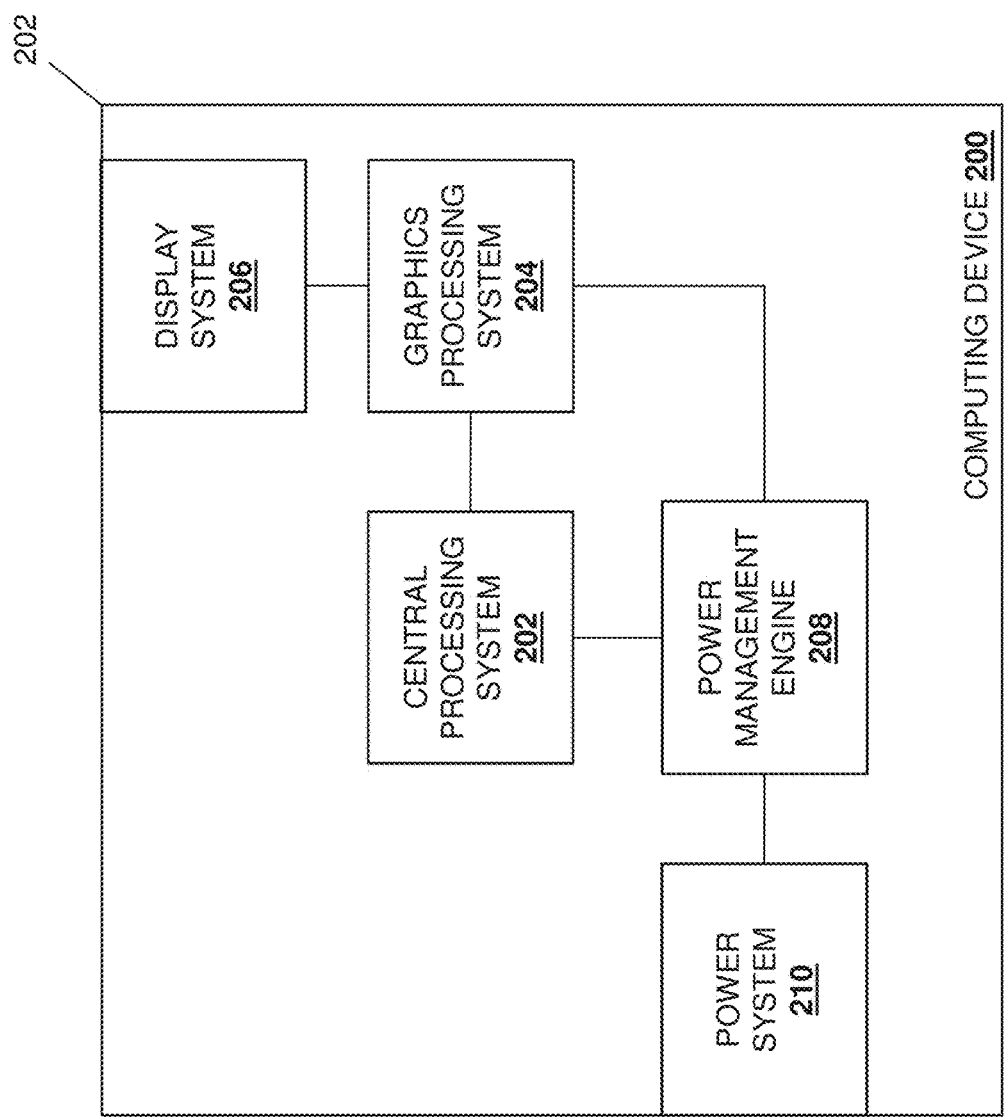
FIG. 2 is a schematic view illustrating an embodiment of a computing device.

Referring now to FIG. 2, an embodiment of a computing device 200 is illustrated. In an embodiment, the computing device 200 may be the IHS 100 discussed above with reference to FIG. 1, and/or may include some or all of the components of the IHS 100. In the illustrated embodiment, the computing device 200 includes a chassis 202 that houses the components of the computing device 200, only some of which are illustrated in FIG. 2. For example, the chassis 202 may house a central processing system 202 that may be provided by, for example, one or more Central Processing Units (CPUs) that may include CPU package(s) having a plurality of CPU cores (e.g., the four CPU cores in some of the examples below), and/or other central processing subsystems that would be apparent to one of skill in the art in possession of the present disclosure. The chassis 202 may also house a graphics processing system 204 that is coupled to the central processing system 202 and that may be provided by, for example, a Graphics Processing Unit (GPU) and/or other graphics processing subsystems that would be apparent to one of skill in the art in possession of the present disclosure. As discussed above, the graphics processing system 204 may provide a discrete GPU that is separate and distinct from the CPU provided by the central processing system 202, as is known in the art of high performance graphics computing devices. The graphics processing system 204 is coupled to a display system 206 and, as discussed below, may be configured to render graphics for display on the display system 206 in response to instructions and/or other data received from the central processing system 202. While the display system 206 is illustrated as housed in the chassis 202 in FIG. 2, one of skill in the art in possession of the present disclosure will recognize that the display system 206 may be coupled to graphics processing system 204 via an external connector on the chassis 202 while remaining within the scope of the present disclosure.

The chassis 202 may also house a processing system (not illustrated, but which may include the processor 102 discussed above with reference to FIG. 1) that is coupled to a memory system (not illustrated, but which may include the memory 114 discussed above with reference to FIG. 1) that includes instructions that, when executed by the processing system, cause the processing system to provide a power management engine 208 that is configured to perform the functionality of the power management engines and computing devices discussed below. In the illustrated embodiment, the power management engine 208 is coupled to each of the central processing system 202 and the graphics processing system 204 (e.g., via couplings between the processing system that provides the power management engine 208 and each of the central processing system 202 and the graphics processing system 204).

In some examples, the power management engine 208 may be provided by a Basic Input/Output System (BIOS) that is included in the computing device 200 and provided by nonvolatile firmware that is configured to perform hardware initialization during a booting process of the computing device (e.g., power-on startup, reboot, and/or other initialization processes), provide runtime services for operating systems and programs executed on the computing devices, as well as perform the power management functionality discussed below (e.g., modifications of the performance states table/C-states table via a _CST call). In other examples, the power management engine 208 may be provided by other firmware that is configured to provide the power management functionality discussed below. In yet other examples, the functionality of the power management engine 208 may be provided, at least in part, by the central processing system 202. For example, the central processing system 202 may operate in conjunction with an external requester to receive a performance state modification request and, in response, place itself into the best available matching performance state (e.g., deeper sleep where possible, but in some cases being unable to sleep as deeply as requested). In yet another example, the functionality of the power management engine 208 may be provided by an event listener configured to listen for events indicative of the graphics processing systems activity threshold and, in some cases, an external power connection, in which case polling functionality is not needed. While a few examples of hardware for providing the functionality of the power management engine 208 have been described, one of skill in the art in possession of the present disclosure will recognize that the power management functionality described herein may be enabled by a variety of hardware and/or software while remaining within the scope of the present disclosure.

The chassis 202 may also house a power system 210 that is coupled to the power management engine 208 (e.g. via a coupling between the processing system that provides the power management engine 208 and the power system 210) and that may include, for example, a battery subsystem (e.g., a rechargeable battery subsystem, a single use battery subsystem, etc.), a power adapter connector (e.g., for connecting to a power adapter that is configured to couple to a power supply via a wall outlet, discussed further below), and/or a variety of other power system components that would be apparent to one of skill in the art in possession of the present disclosure. While a specific computing device 200 has been described, one of skill in the art in possession of the present disclosure will recognize that computing devices may include a variety of other components and/or component configurations that provide for a variety of conventional computing device functionality, as well as the functionality discussed below, while remaining within the scope of the present disclosure.

Figure 3:
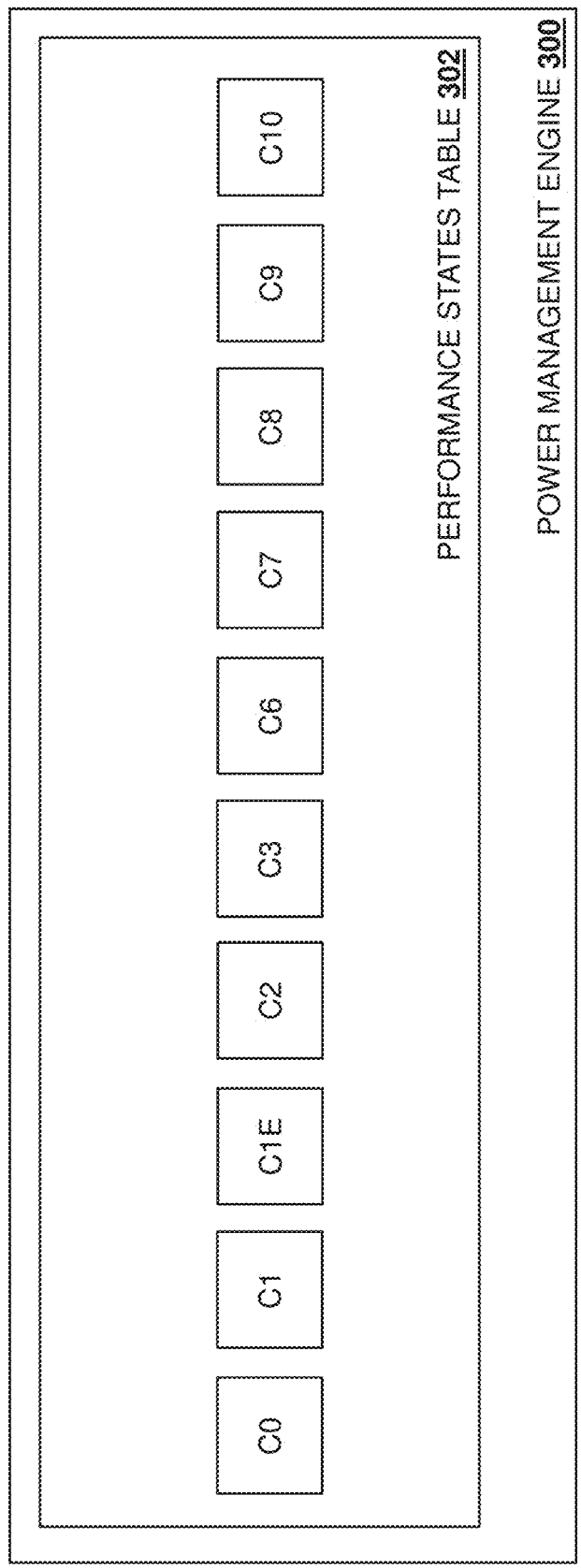
FIG. 3 is a schematic view illustrating an embodiment of a power management engine included in the computing device of FIG. 2.

Referring now to FIG. 3, an embodiment of a power management engine 300 is illustrated that may be the power management engine 208 discussed above with reference to FIG. 2. In the illustrated embodiment, the power management engine 300 includes or has access to a performance states table 302 that is associated with the central processing system 202. In the embodiments discussed below, the performance states table 302 provides performance states for the central processing system 202 defined by the Advanced Configuration and Power Interface (ACPI) standards (e.g., a C-States Table that defines C-states for any cores available in a CPU), although other types of performance states tables providing other types of performance states may fall within the scope of the present disclosure as well. In the illustrated embodiment, the performance states table 302 includes performance states C0, C1, C2, C3, C4, C5, C6, C7, C8, C9, and C10, and one of skill in the art in possession of the present disclosure will recognize that such a performance states table 303 may be provided with central processing systems such as the HASWELL® central processing system provided by INTEL® Corporation of Santa Clara, Calif., United States, although other types of central processing systems having other types of performance states tables are envisioned as falling within the scope of the present disclosure as well.

In the examples provided below, the performance states table 302 is described as including performance states that include an operating state (C0) and a plurality of sleep states (C1-C10). For example, the C0 performance state may be considered the "operating state" or "working state" in which the central processing system 202 is active and executing code or other instructions. For example, a CPU package C0 state may be considered the normal operating state for the CPU package, and the CPU package may remain in the C0 state when at least one of its CPU cores is in the C0 or C1 state or when the computing device has not granted permission for the CPU package to go into a sleep state. As such CPU cores may operate in sleep states while the CPU package is in the C0 state.

The C1 performance state may be considered a sleep state in which the central processing system 202 has been automatically halted (the C1 performance state is sometimes referred to as "Halt" or "AutoHALT") such that it is not executing instructions, but is configured to return to an executing state essentially instantaneously. For example, as discussed above, the CPU package may be operating in the C0 performance state while the CPU cores operate in the C1 performance states. Some central processing systems may include a C1 E performance state that may be considered an "enhanced C1 state" or "enhanced halt state" that provides lower power consumption than the "regular C1 state" or "regular halt state" by, for example, having the CPU cores halted (as in the C1 performance state) with the lowest frequency and voltage operating point while the CPU package operates in the C0 performance state.

The C2 performance state may be considered a sleep state in which the use of the central processing system 202 is restricted due to, for example, the powering down of an Input/Output (I/O) controller in the central processing system 202. For example, in the C2 performance state, each of the CPU cores may operate in the C3 performance state (or deeper) with the memory path open, which is typically provided before the CPU package enters the C3 performance state. The CPU package C2 state may provide an internal processor state that cannot be explicitly requested by software in the computing device, and may be entered into by the CPU package when each of the CPU cores have requested a C3 or deeper sleep state and all GPU cores are in RC6, but constraints prevent entry into any sleep state deeper than the C2 state.

The C3 performance state may be considered a sleep state in which the clock of the central processing system 202 has been stopped but an all-software visible state is maintained. For example, in the C3 performance state, each of the CPU cores may operate in the C3 performance state (or deeper) and may flush their L1 instruction cache, L1 data cache, and L2 cache to the Last Level Cache (LLC) shared cache, and the LLC shared cache may be flushed with the clocks to each CPU core shut off. A CPU package may enter the C3 state when at least one CPU core is in the C3 state, the other CPU cores are in a C3 or deeper sleep state and the CPU package has been granted permission by the computing device, or the computing device has not granted a request to enter a CPU package C6/C7 or deeper sleep state but has allowed a CPU package C3 state. As discussed above, in the CPU package C3 state, the LLC shared cache is valid.

The C6 performance state may be considered a sleep state in which the central processing system 202 is powered down. For example, in the C6 performance state, the CPU cores may save their architectural state before core voltage is removed, and base block (BCLK) is off. The CPU package may enter the C3 state when at least one CPU core is in the C6 state, the other CPU cores are in a C6 or deeper sleep state and the CPU package has been granted permission by the computing device, or the computing device has not granted a request to enter a CPU package C7 or deeper sleep state but has allowed a CPU package C6 state. As discussed above, in the CPU package C6 state, all CPU cores have saved their architectural state and have had their voltages reduced to zero, and it is possible that the LLC shared cache is flushed and turned off.

The C7, C8, C9, and C10 states may provide for the disabling of other blocks of the central processing system 202. For example, in the C7 performance state, the CPU cores may behave similarly as discussed above for the C6 performance state, but if all CPU cores request the C7 performance state, the LLC may be flushed until it is clear, and if the entire LLC is flushed, voltage is removed from the LLC. The CPU package may enter the C7 state when all the CPU cores are in the C7 or deeper sleep state and the Operating System may request that the LLC be flushed.

In the C8 performance state, the LLC must be flushed. The CPU package may enter the C8 state when all the CPU cores are in the C8 state, and the display engine may remain on. In the C9 performance state, most Uncore voltages are at zero, and IA, GT, and SA are reduced to 0 volts while $Vcc_{IO}$ remains on. The CPU package may enter the C9 state when all the CPU cores are in the C9 state, and the VRs may be turned off. In the C10 performance state, all VRs are at PS4 or LPM (i.e., near shut off) and the 24 MHz clock is off. The CPU package may enter the C10 state when all the CPU cores are in the C10 state. However, while a specific example of a performance states table 302 has been discussed, one of skill in the art in possession of the present disclosure will recognize that different central processing systems may utilize performance state tables with different performance states that provide for different central processing system functionality while remaining within the scope of the present disclosure.

Figure 4:
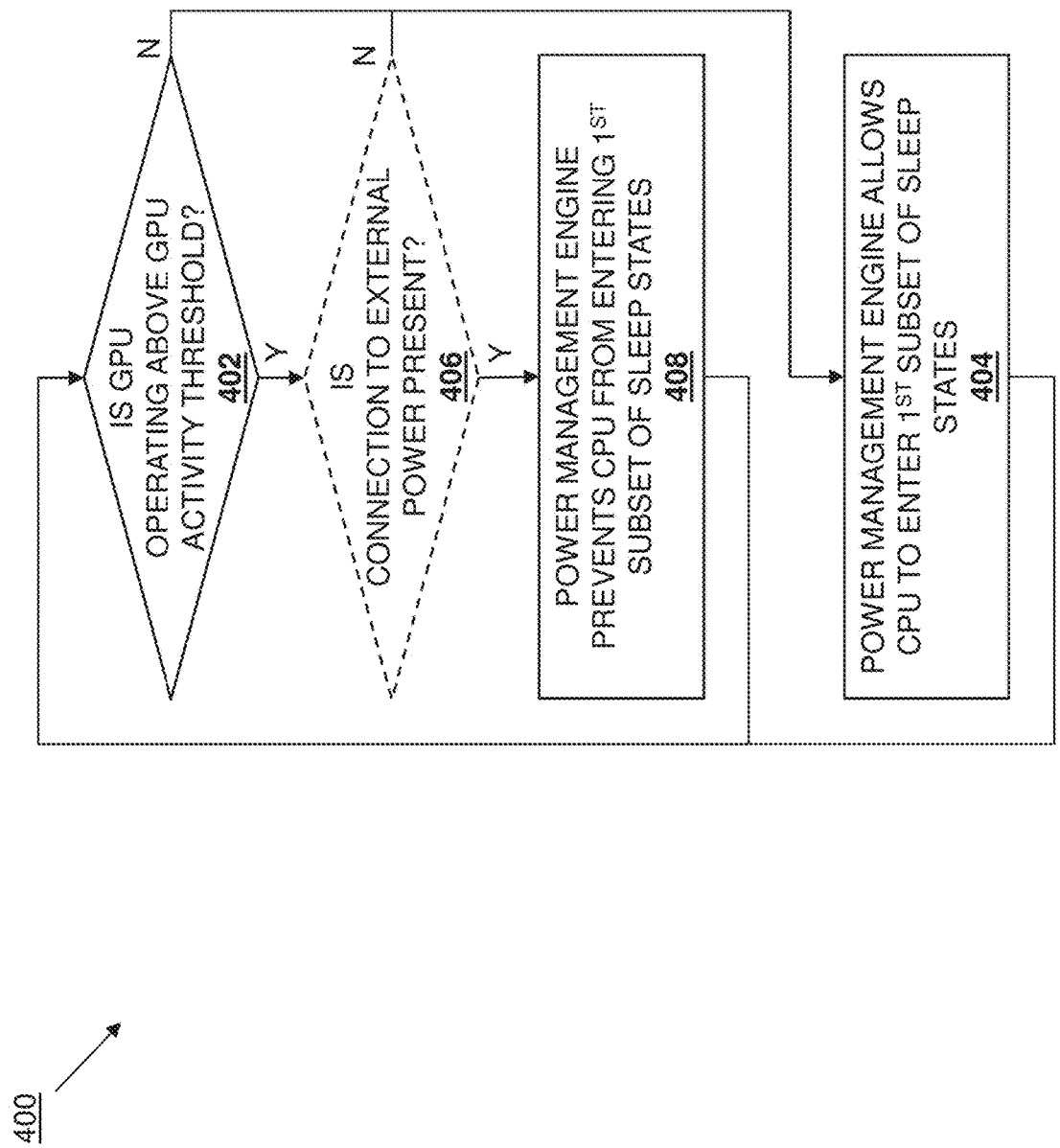
FIG. 4 is a flow chart illustrating an embodiment of a method for providing modified sleep state graphic processing.

Referring now to FIG. 4, an embodiment of a method 400 for providing modified sleep state graphic processing is illustrated. As discussed below, the systems and methods of the present disclosure provide for the dynamic and automatic manipulation of central processing system sleep states in order to prevent the central processing system from introducing graphics processing issues via delays in the sending of instructions and other data to the graphics processing system that result from the central processing system entering and exiting sleep states between the rendering of graphics (e.g., video image frames) by the graphics processing system. As detailed below, in experimental embodiments the systems and methods described herein have shown measurable, statistically relevant gains in performance across different computing device platforms, providing for higher performance in computing devices while utilizing conventional graphics processing system components (e.g., the same CPUs, GPUs, and other components utilized in conventional systems.)

The method 400 begins at decision block 402 where it is determined whether a graphics processing system is operating above a graphics processing system activity threshold. In an embodiment, at decision block 402, the power management engine 208 may operate to determine whether the graphics processing system 204 is operating above a graphics processing activity threshold during runtime operations of the computing device 200 by, for example, determining that a graphics processing system temperature of the graphics processing system 204 is above a temperature threshold, determining that a graphics processing system power consumption of the graphics processing system 204 is above a power consumption threshold, determining that a graphics processing system utilization of the graphics processing system 204 is above a utilization threshold, and/or utilizing any other graphics processing system activity measurement that would be apparent to one of skill in the art in possession of the present disclosure. In some embodiments, the graphics processing system activity threshold may be defined such that any operation of the graphics processing system 204 causes the graphics processing system activity threshold to be exceeded (i.e., if the graphics processing system 204 has been activated (e.g., is in an "on" state), the graphics processing system activity threshold may be determined to have been met or exceeded. As such, in specific examples, any detectable graphics processing system temperature, power consumption, utilization, or other activity measurement for the graphics processing system 204 may be interpreted by the power management engine 208 as being above the graphics processing system activity threshold.

In other embodiments, the graphics processing system activity threshold may be defined such that a predefined operation of the graphics processing system 204 causes the graphics processing system activity threshold to be met or exceeded. For example, the predefined operation of the graphics processing system 204 may include operation that is associated with high performance graphics processing that experiences particular benefits from the systems and methods of the present disclosure. As such, the use of the graphics processing system 204 to render screens associated with the operating system, word processing applications, most Internet webpages, and/or other relatively low-graphics processing image/video frames may provide an operation of the graphics processing system 204 that is below the graphics processing system activity threshold, while the use of the graphics processing system 204 to render screens associated with video games, Computer Aided Design (CAD) applications, Computer Aided Manufacturing (CAM) applications, Digital Content Creation (DCC) applications, and/or other relatively high-graphics processing image/video frames may provide an operation of the graphics processing system 204 that is above the graphics processing system activity threshold. Thus, in specific examples, graphics processing system temperature, power consumption, utilization, or other activity measurements for the graphics processing system 204 that are associated with the predefined operation/relatively high graphics processing may be interpreted by the power management engine 208 as being above the graphics processing system activity threshold. Furthermore, the use of the computing system to launch specific programs or applications (e.g., the video games, CAD applications, CAM applications, DCC applications, etc.) may automatically result in a determination that the graphics processing system activity threshold has been met or exceeded without the need to make the measurements discussed above.

In yet other embodiments, the determining that the graphics processing system 204 is operating above the graphics processing system activity threshold may include determining that the graphics processing system 204 has rendered graphics within some time period. As such, if the graphics processing system 204 is utilized to render graphics for display, the graphics processing system activity threshold will be met or exceeded for that time period. Similarly, the determining that the graphics processing system is operating below the graphics processing activity threshold may include determining that the graphics processing system has not rendered graphics within the time period. As such, if the graphics processing system 204 stops rendering graphics for display for some amount of time, the graphics processing system activity threshold will not be met or exceeded. While a few examples have been provided, one of skill in the art in possession of the present disclosure will recognize that the meeting or exceeding of the graphics processing system activity threshold may be defined, determined, or otherwise identified in any of a variety of manners that provide for the benefits described below while remaining within the scope of the present disclosure.

If, at decision block 402, it is determined that the graphics processing system is not operating above the graphics processing system activity threshold, the method 400 proceeds to block 404 where the power management engine allows a central processing system to enter a first subset of sleep states. In an embodiment, at block 404, the power management engine 208 may operate to allow the central processing system 202 to enter a subset of sleep states that are available to the central processing system 202. With reference to FIG. 3 and the embodiment of the performance states table 302, in the specific examples provided below, the performance states table 302 includes the operating state C0, a first subset of sleep states C2-C10, and a second subset of sleep states C1. In experimental embodiments with power management engines including such performance states tables, it was found that the sleep state C1 provided for operation of the central processing system 202 with a relatively low, predictable latency associated with transitioning from the sleep state C1 to the operating state C0. Furthermore, it was found that the sleep state C2 provided for operation of the central processing system 202 with a relatively low but variable, unpredictable latency associated with transitioning from the sleep state C2 to the operating state C0 (resulting from, for example, the powering down of the I/O controller and the unpredictability in the time needed to power the I/O controller back up in order to transition from sleep state C2 back to operating state C0.) Further sleep states C3-C10 were found to be associated with increased latency and/or further variability/unpredictability with that latency as well.

As such, in those experimental embodiments, the first subset of sleep states was defined as including the sleep states C2-C10 because those sleep states were associated with increased latency and/or variability/unpredictability in transitioning back to the operating state C0, while the second subset of sleep states were defined as including only the sleep state C1 that provided for predictable, near-instantaneous transitioning back to the operating state C0. As such, at block 404, the power management engine 208 may operate to allow the central processing system 202 to enter the first subset of sleep states C2-C10 (while also allowing the central processing system 202 to enter the second subset of sleep states C1) as long as the graphics processing system 204 operates below the graphics processing system activity threshold (e.g., as long as the graphics processing system 204 is not operating, or is performing relatively low graphics processing intensive operations, all sleep states available to the central processing system 202 may be made available to the central processing system 202), as the method 400 will subsequently return to decision block 402 to determine whether the graphics processing system 204 is operating above the graphics processing system activity threshold substantially as described above.

However, while specific subsets of the particular performance states table 302 are provided as an example above, one of skill in the art in possession of the present disclosure will appreciate that performance states tables may differ from computing device platform to computing device platform and/or from CPU to CPU, and different subsets of the performance states/operating states/sleep states may be utilized in the method 400 to provide the benefits discussed herein while remaining within the scope of the present disclosure. For example, performance states tables with fewer performance states (e.g., an operating state C0 and sleep states C1, C2, and C3) will benefits from the teachings of the present disclosure and thus are envisioned as falling within its scope. Furthermore, improvements to the latency associated with the transition from sleeps state(s) to operating states, or reductions in the variability and/or increases in the predictability of those latencies may allow sleep states to be removed from the first subset of sleep states and added to the second subset of sleep states discussed above. Using the particular example discussed above, in the event the powering up of the I/O controller meets a minimum level of predictability in the future, the relatively low latency of sleep state C2 may allow it to be removed from the first subset of sleep states and added to the second subset of sleep states while remaining within the scope of the present disclosure. As such, one of skill in the art in possession of the present disclosure will recognize that the performance states table 302 described herein is merely an example, and performance state tables with other first and second subsets (and even third or higher subsets) may fall within the scope of the present disclosure as well.

Figure 5:
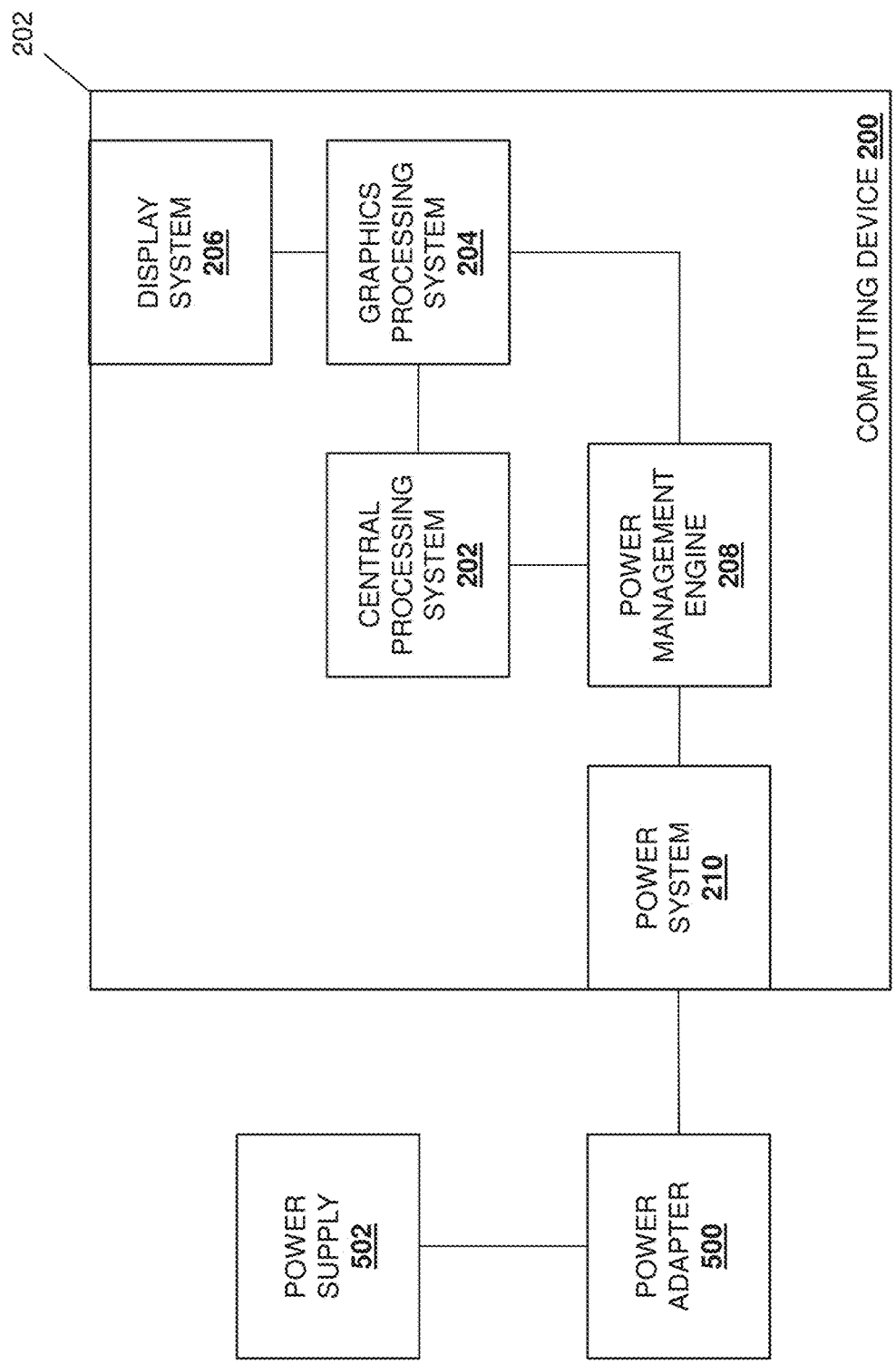
FIG. 5 is a schematic view illustrating a power adapter connected to a power source and to the computing device of FIG. 2.

If, at decision block 402, it is determined that the graphics processing system is operating above the graphics processing system threshold, the method 400 may proceed to optional decision block 406 where it is determined whether a connection to external power is present. With reference to FIG. 5, in an embodiment of decision block 406, the power management engine 208 may operate to determine whether the power system 210 is coupled to an external power source such as, for example, via the power adapter 500 in FIG. 5 that is connected to the power system 210 as well as to a power supply 502 (e.g., a wall outlet). As discussed below, optional decision block 406 provides for the activation of the modifiable sleep state graphics processing system of the present disclosure in the event that the computing device 200 is receiving external power and not relying on limited battery power for operation, as the operation of the modifiable sleep state graphics processing system causes the central processing system 202 to consume more power as a result of limiting of its ability to enter one or more of its deep sleep states. As such, the inclusion of the performance of optional decision block 406 may be particular beneficial in computing devices with relatively smaller batteries or limited power storage, while computing devices with larger batteries or power storage may omit optional decision block 206. Furthermore, the user of the computing device 200 may have the ability to enable or disable the performance of optional decision block 406 via, for example, a computing device power settings Graphical User Interface (GUI) (e.g., a "power savings" mode, "portable/mobile" mode, or other battery enabled mode may cause the inclusion of optional decision block 406 in the method 400.) While a few examples have been provided, one of skill in the art in possession of the present disclosure will recognize that the performance of optional decision block 406 may be determined based on a variety criteria while remaining within the scope of the present disclosure.

If, at optional decision block 406, it is determined that a connection to external power is not present, the method 400 proceeds to block 404 where the power management engine allows the central processing system to enter the first subset of sleep states in substantially the same manner as discussed above. As such, using the specific examples discussed above, if the computing device 200 is operating on battery power, the power management engine 208 may allow the central processing system 202 to enter any of the sleep states C1-C10 in the performance states table 302. However, if at optional decision block 406 it is determined that a connection to external power is present, or in embodiments where it was determined that the graphics processing system 204 was operating above the graphics processing system activity threshold at decision block 402 and optional block 406 is omitted, the method 400 proceeds to block 408 where the power management engine prevents the central processing system from entering the first subset of sleep states.

Figure 6:
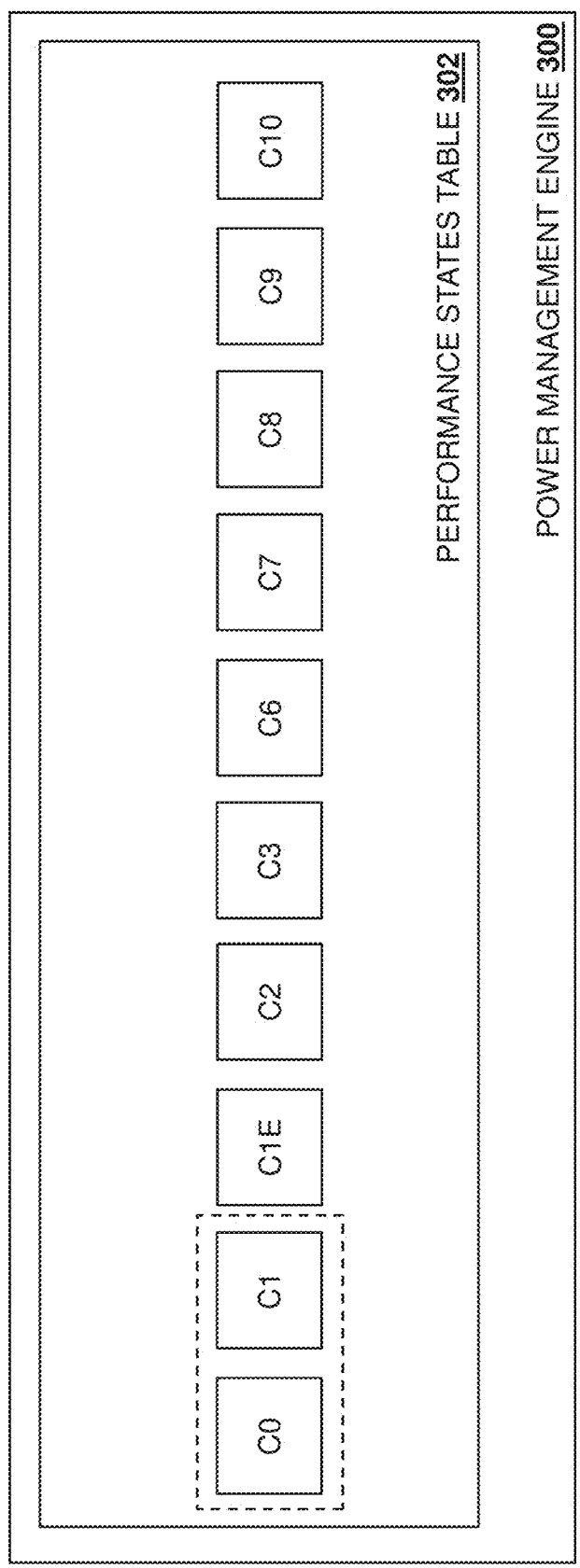
FIG. 6 is a schematic view illustrating an embodiment of the power management engine of FIG. 3 modifying sleep states available to a central processing system in the computing device of FIG. 2.

In an embodiment, at block 408, the power management engine 208 may operate to prevent the central processing system 202 from entering the first subset of sleep states. With reference to FIG. 6, and as discussed above for at least some specific embodiments, at block 408 the central processing system 202 may be allowed to transition between the operating state C0 and the sleep state C1 (as indicated by the dashed box provided in the performance states table 302 in FIG. 6), while being prevented from entering into "deeper" sleep states (i.e., the first subset of sleep states C2-C10 that are outside the dashed box in FIG. 6), which provides for power savings associated with entering and remaining in the sleep state C1 while ensuring near-instantaneous transition back to the operation state C0, thus avoiding the negative effects on graphics processing performance that are associated with the increased latency and/or increased variability/reduced predictability of that latency. For example, in a specific embodiment, at block 408 a CPU C-State table may be modified in BIOS vis-à-vis ACPI's _CST to limit the C-states available to the CPU to C0 and C1. As would be appreciated by one of skill in the art in possession of the present disclosure, the enablement and disablement of the first subset of sleep states may be provided via the method 400 as a dynamic, automated process that does not require user interaction (i.e., once the system is activated, or if it has been activated as a default, the disablement and enablement of the first subset of sleep states is performed by the power management engine 208 and without user interaction.)

The method 400 may then return to decision block 402 to determine whether the graphics processing system 204 is operating above the graphics processing system activity threshold substantially as described above. As such, in some embodiments following the preventing of the central processing system 202 from entering the first subset of sleep states at block 408, the graphics processing system 204 may be determined at decision block 402 to no longer be above the graphics processing system activity threshold, and the method 400 may proceed to block 404 where the power management engine allows central processing system to enter the first subset of sleep states. For example, in a specific embodiment, at block 404 a CPU C-State table may be modified in BIOS vis-à-vis ACPI's _CST to reenable the C-states available to the CPU to C0-C10. Thus, the sleep states C2-C10 may be "enabled" and "disabled" based on the operation of the graphics processing system 204 (and, in some embodiments, the presence of external power) to provide high performance graphics processing while also conserving battery life.

Figure 7A:
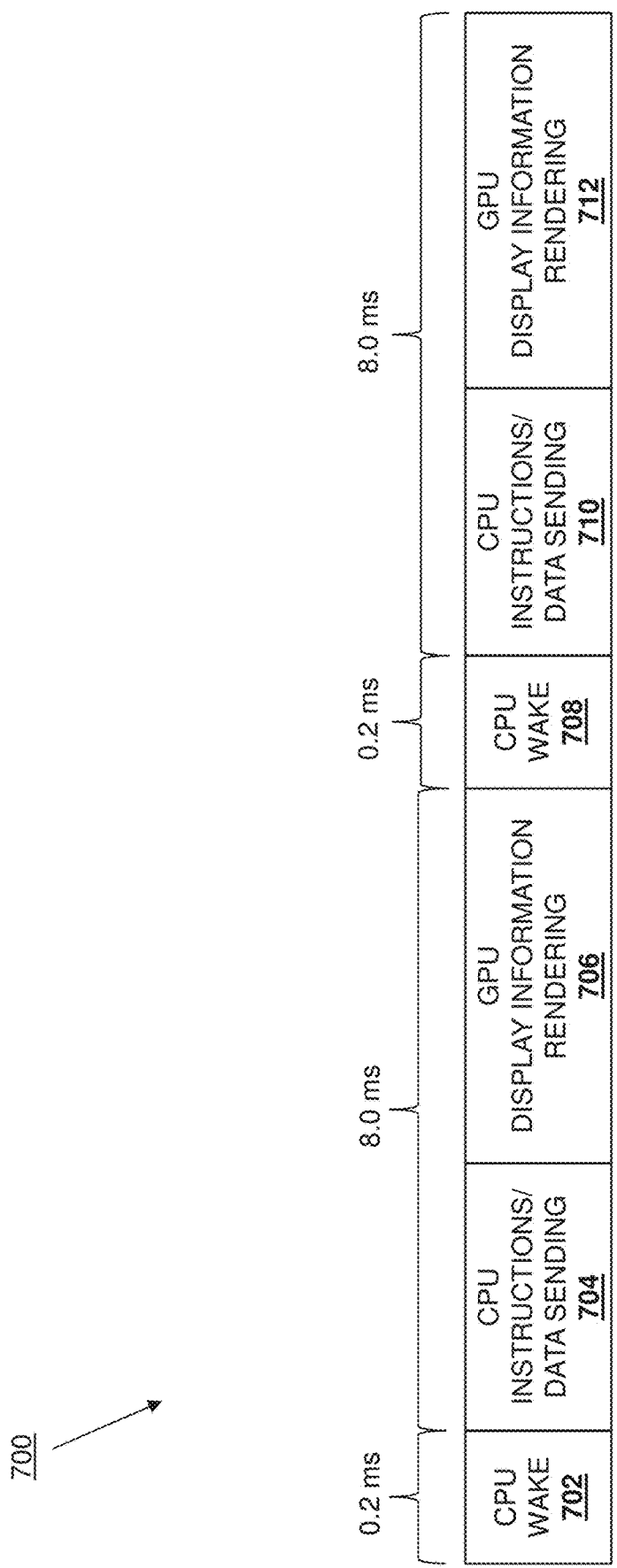
FIG. 7A is a chart illustrating an embodiment of the results of conventional graphics processing via a CPU and GPU.

With reference to FIG. 7A, an embodiment of the results of conventional graphics processing via a CPU and GPU are illustrated. The chart 700 in FIG. 7A begins with the CPU initially in a sleep state (one of the sleep states C2-C10 discussed above in this example), and illustrates how a CPU wake operation 702 is performed by the CPU (e.g., to transition from any of the sleep states C2-C10 to the operating state C0), followed by a CPU instructions/data sending operation 704 that is performed by the CPU to send data and/or instructions to the GPU. Upon receipt of those instructions/data, a GPU display information rendering operation 706 is performed by the GPU 204 to render display information (e.g., graphics) on a display device, during which time the CPU will become idle or otherwise transition from the operating state C0 back to any of the sleep states C2-C10 in order to conserve power. When the GPU display information rendering operation 706 is complete, a CPU wake operation 708 is performed by the CPU (e.g., to transition from any of the sleep states C2-C10 to the operating state C0), followed by a CPU instructions/data sending operation 710 that is performed by the CPU to send data and/or instructions to the GPU, and a GPU display information rendering operation 712 that is performed by the GPU 204 in the same manner as described above.

As such, conventional graphics processing results in the CPU continually transition between any of the sleep states C2-C10 and the operating state C0 in order to conserve power. However, as can be seen in FIG. 7A, the latency associated with the CPU wake operations 702 and 704 from the "deeper" sleep states (e.g., C2-C10) can take a relatively significant amount of time (0.2 ms in the illustrated embodiment), particular with regard to the time necessary to perform the CPU instructions/data sending operations 704/710 and the GPU display information rendering 706/712. It has been found that the latency associated with the CPU wake operations 702 and 704 from the "deeper" sleep states can operate to vary the frame rate (and/or other characteristics of the graphics) produced by the GPU, which causes degradation in the user perception of the graphics being displayed, an effect that is particular noticeable in relatively higher frame rate applications. Furthermore, the effects of the CPU wake operations 702/708 become more negative (e.g., results in further noticeable degradation) as the GPU is capable of operating faster, as the CPU wake operations 702/708 become a larger portion of the time needed to render a frame as the GPU display information rendering operations 706/712 reduces.

Figure 7B:
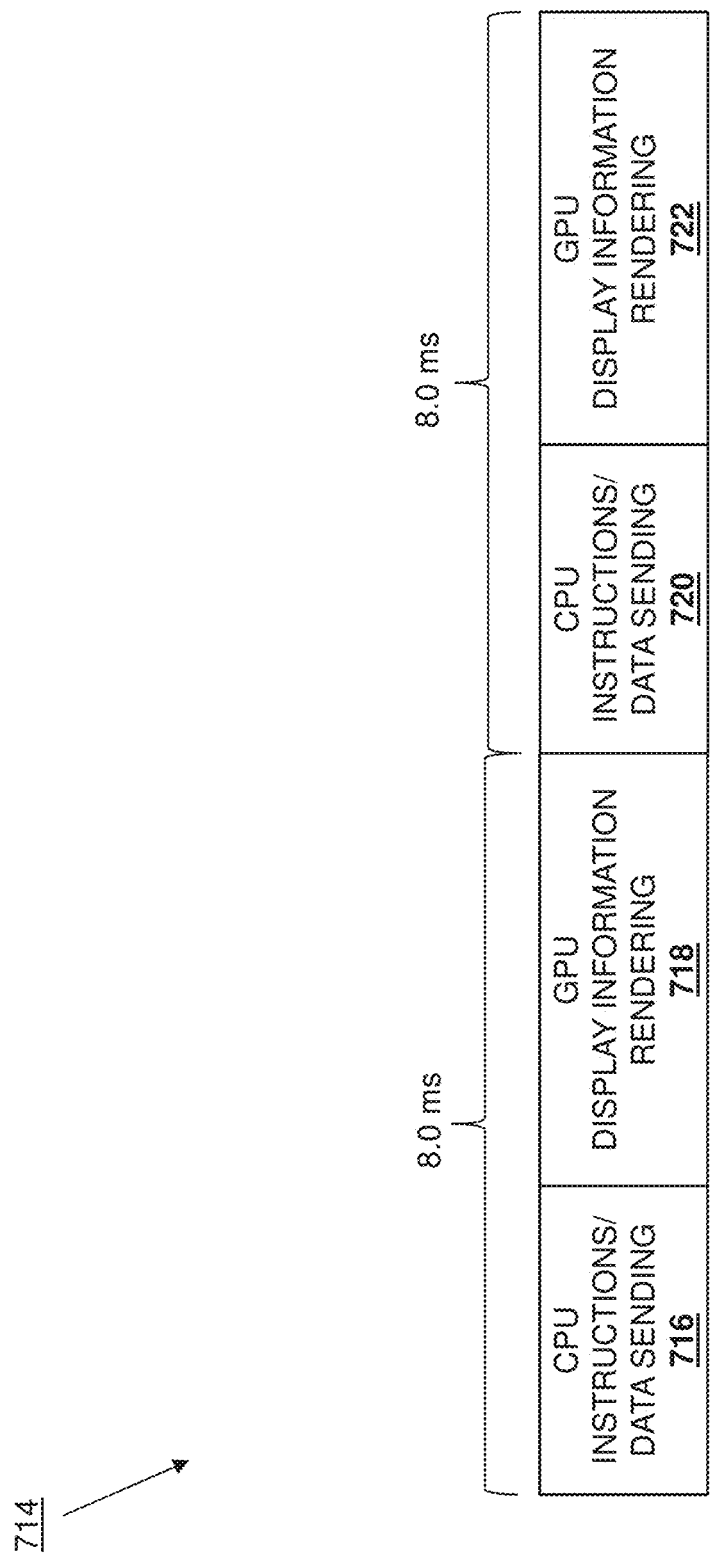
FIG. 7B is a chart illustrating an embodiment of the results of graphics processing according to the teachings of the present disclosure.

With reference to FIG. 7B, an embodiment of the results of graphics processing via a CPU and GPU according to the teachings of the present disclosure are illustrated. The chart 714 in FIG. 7B assumes the CPU is initially in the second subset of sleep states (e.g., the sleep state C1 as discussed above), and illustrates how any CPU wake operation (e.g., to transition from the sleep state C1 to the operating state C0) is nearly instantaneous, followed by a CPU instructions/data sending operation 716 that is performed by the CPU to send data and/or instructions to the GPU. Upon receipt of those instructions/data, a GPU display information rendering operation 718 is performed by the GPU 204 to render display information (e.g., graphics) on a display device, during which time the CPU will become idle or otherwise transition from the operating state C0 back to the second subset of sleep states C1 in order to conserve power. When the GPU display information rendering operation 718 is complete, the CPU wake operation is performed by the CPU (e.g., to transition from the sleep state C1 to the operating state C0) nearly instantaneously again, followed by a CPU instructions/data sending operation 720 that is performed by the CPU to send data and/or instructions to the GPU, and a GPU display information rendering operation 722 that is performed by the GPU 204 in the same manner as described above.

As such, graphics processing according to the teachings of the present disclosure results in the CPU continually transitioning between sleep state C1 and the operating state C0 in order to conserve power. However, as can be seen in FIG. 7B, the latency associated with the CPU wake operations to transition between the second subset of sleep states C1 and the operating state C0 adds no appreciable time to the graphics rendering process, particular with regard to the time necessary to perform the CPU instructions/data sending operations 716/716 and the GPU display information rendering 720/722. It has been found that the latency associated with the CPU wake operations 716 and 716 from the C1 sleep state does not appreciably vary the frame rate (and/or other characteristics of the graphics) produced by the GPU, preventing the degradation in the user perception of the graphics being displayed as is experienced in conventional graphics processing systems. For example, comparing the charts in FIGS. 7A and 7B illustrates how the systems and methods of the present disclosure can provide for the rendering of graphics in each image/video frame in 8.0 ms as compared to the 8.2 ms required by conventional graphics processing systems.

Figure 8A:
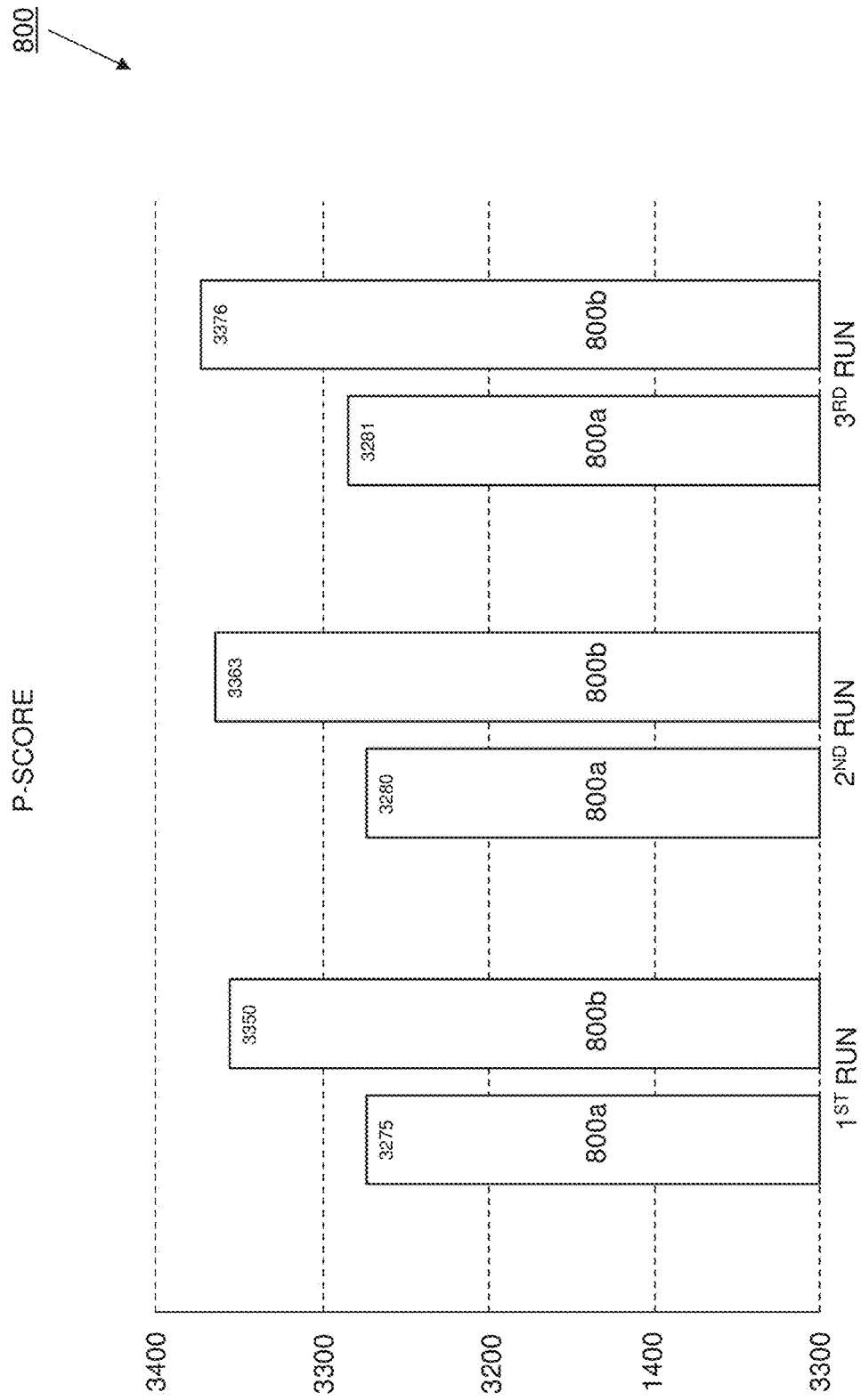
FIG. 8A is a graph illustrating an experimental embodiment of performance scores obtained using conventional graphics processing vs. graphics processing according to the teachings of the present disclosure.
Figure 8B:
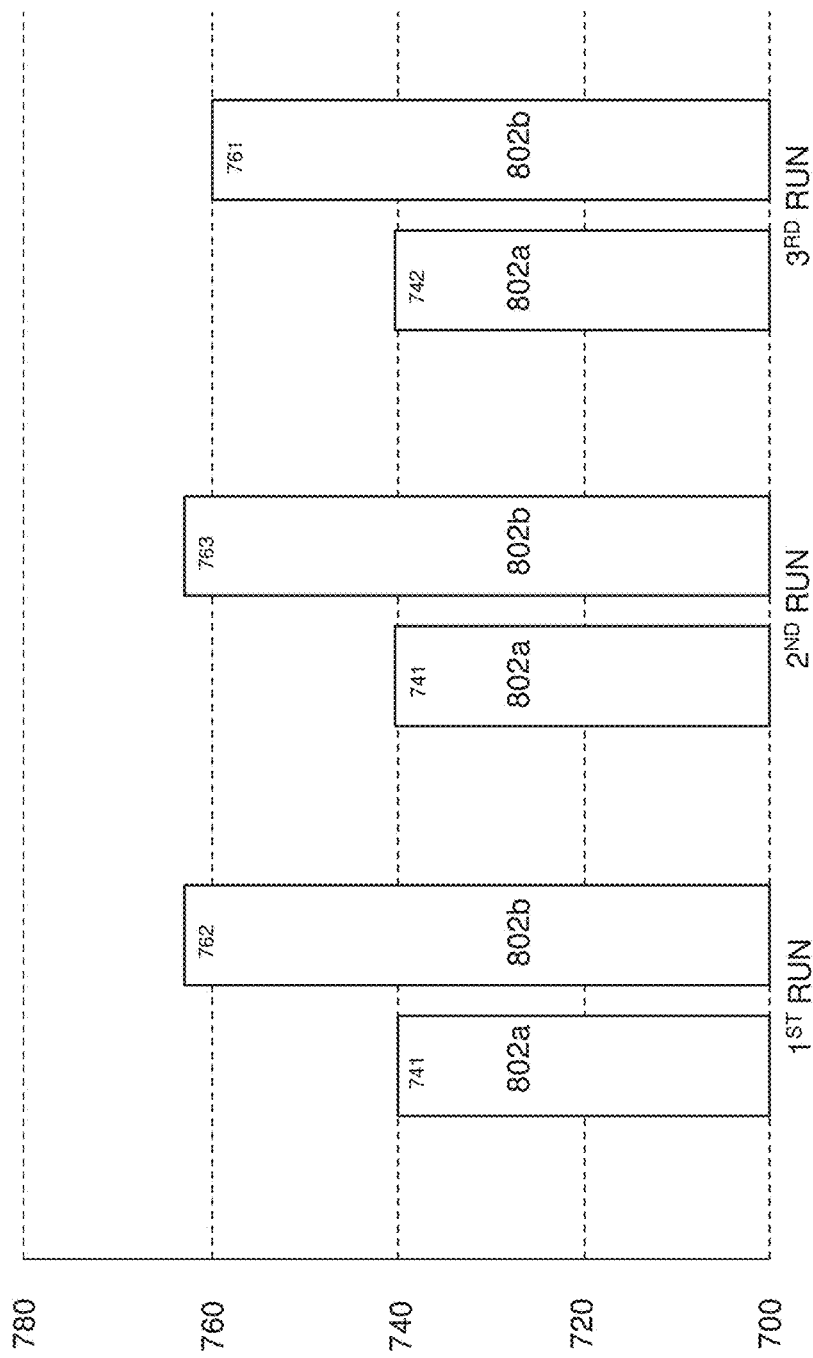
FIG. 8B is a graph illustrating an experimental embodiment of time spy measurements obtained using conventional graphics processing vs. graphics processing according to the teachings of the present disclosure.

With reference to FIGS. 8A and 8B, graphs 800 and 802 illustrate experimental embodiment of P-scores and time spy measurements obtained using conventional graphics processing vs. graphics processing according to the teachings of the present disclosure. As would be understood by one of skill in the art in possession of the present disclosure, the 3DMARK® computer benchmarking tool created and developed by FUTUREMARK® Corporation of Espoo, Finland provides for measurements of the performance of a computing device's 3D graphic rendering and CPU workload processing capabilities. Specifically, running the 3DMARK® tool may provide for a variety of 3DMARK® scores, with higher numbers indicating better performance, and via measurement units that are intended to give a normalized mean for comparing different computing device hardware configurations (mainly GPUs and CPUs). In the experimental embodiments used to generate the charts 800 and 802, the computing device included a common configuration, CPU (INTEL® CORE™ i7-8250U), GPU (NVIDIA® 2 GB N16S-GTR), memory amount (8 GB), and solid state drive size (256 GB), and differed only in the conventional operation 800a/802a via an unmodified performance states table, and novel operation 800b/802b via the modification of the performance state table as described herein.

As can be seen in FIG. 8A, for each of a first run, second run, and third run of the 3DMARK® tool, the conventional operation 800a of the computing device in the experimental embodiments produced 3DMARK® P-scores of 3275, 3280, and 3281, respectively, while for each of a first run, second run, and third run of the 3DMARK® tool, the novel operation 800b of the computing device in the experimental embodiments produced 3DMARK® P-scores of 3350, 3363, and 3376, respectively. With reference to FIG. 8B, for each of a first run, second run, and third run of the 3DMARK® tool, the conventional operation 802a of the computing device in the experimental embodiments produced 3DMARK® time spy measurements of 741, 741, and 742, respectively, while for each of a first run, second run, and third run of the 3DMARK® tool, the novel operation 802b of the computing device in the experimental embodiments produced 3DMARK® time spy measurements of 762, 763, and 761, respectively. One of skill in the art in possession of the present disclosure will recognize that the consistently higher P-scores and time spy measurements via the novel operation 800b/802b taught herein provide recognizable increases in graphics rendering (+2.6-2.8%) that operate to distinguish identically configured systems on the basis of graphics performance.

Figure 9A:
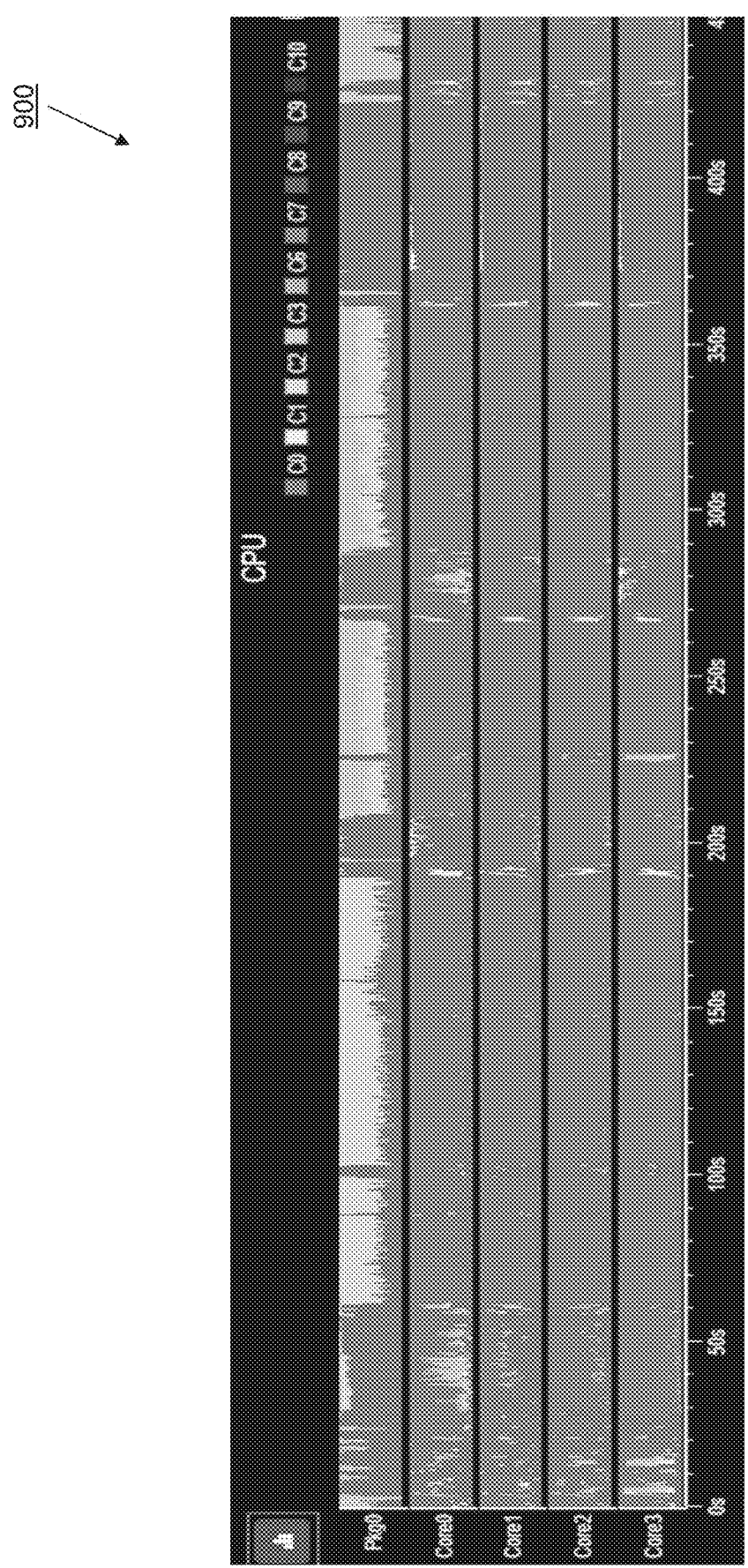
FIG. 9A is a graph illustrating an embodiment of the operation of a CPU according to conventional graphics processing techniques.
Figure 9B:
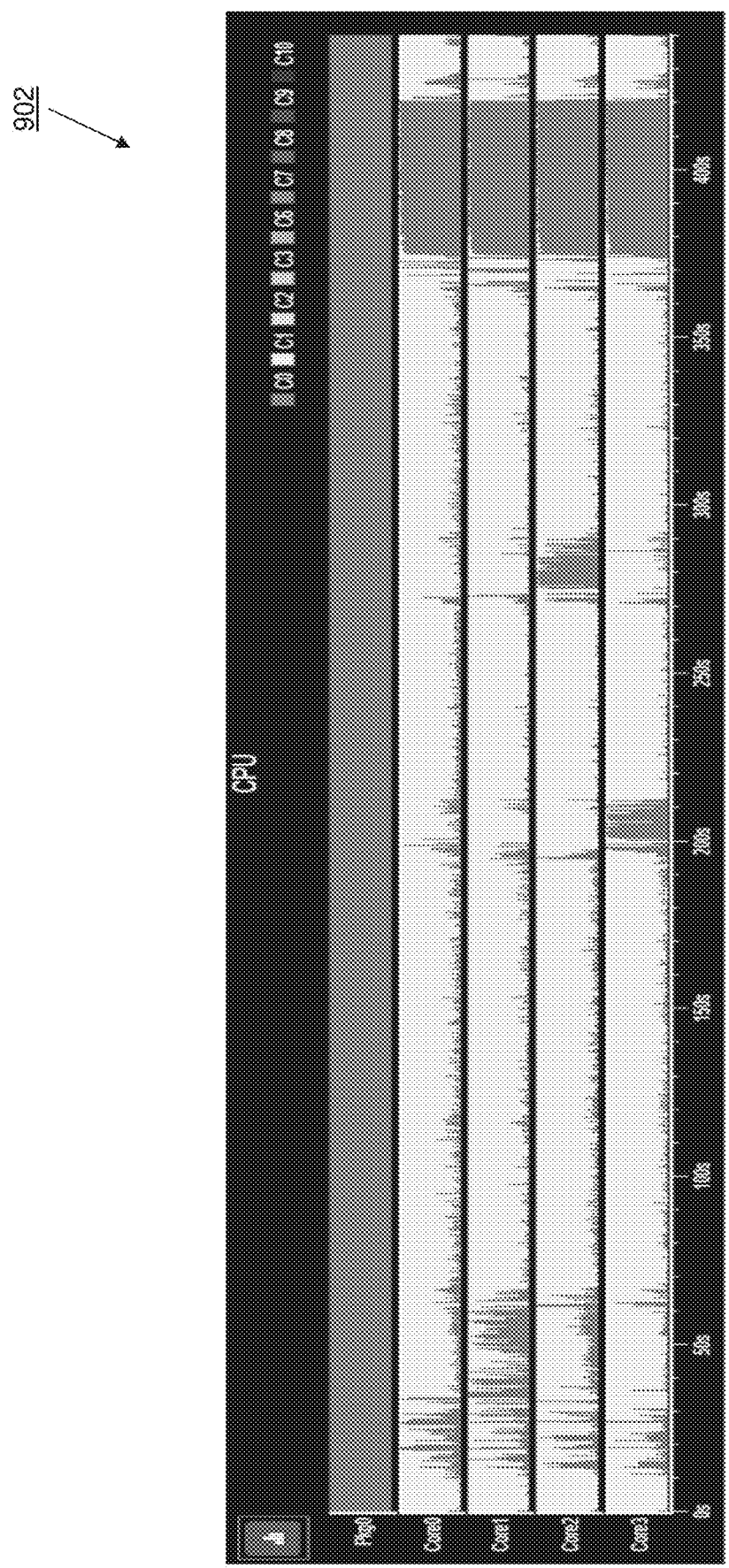
FIG. 9B is a graph illustrating an embodiment of the operation of a CPU according to the graphics processing techniques of the present disclosure.

With reference to FIGS. 9A and 9B, CPU state graphs are provided to illustrate how CPU operation according to the teachings of the present disclosure differs from conventional CPU operation. The conventional CPU state graph 900 in FIG. 9A illustrates the performance states of a CPU package ("Pkg0") as well as each of its four CPU cores ("Core0", "Core1", "Core2", and "Core3"), and provides an example of how each of the four CPU cores are allowed to enter into relatively deep sleep states (C7 and higher) that can result in the issues discussed above, while the CPU package enters into relatively deep sleep states (C3 and higher) as well. The CPU state graph 902 in FIG. 9B illustrates the performance states of a CPU package ("Pkg0") as well as each of its four CPU cores ("Core0", "Core1", "Core2", and "Core3"), and provides an example of how each of the four CPU cores are limited to transitioning between the sleep state C1 and the operating state C0 to provide the graphics processing benefits discussed above, while the CPU package does not leave operating state C0.

Thus, systems and methods have been described that yield measurable benefits to graphics processing performance by dynamically and automatically limiting the depth to which a CPU is allowed to sleep, while still taking measures to conserve battery life/power and ensuring energy conservation certifications (e.g., certifications provided by ENERGY STAR®, the California Energy Commission (CEC), etc.) are met. Such measurable benefits can be appreciated with the following example. Conventionally, a typical CPU/GPU combination interact to provide for graphics rendering via an application requesting the CPU to update a scene, which involves the CPU being utilized to perform cycles to organize and submit instructions/data to the GPU using an Application Programming Interface (API) such as OpenGL or Direct3D. The GPU receives and processes those instructions/data to render a scene to a rendering context on the display, which typically occurs without approximately 16 ms in order to render 60 frames per second on the display. However, 16 ms in CPU time is relatively long (i.e., the CPU measures cycles in billions per second), and results in the CPU seeing an opportunity to reduce its power (i.e., because the application will have to further instructions until the next set of commands will need to be sent to the GPU) and descending into a lower power sleep state. As discussed above, the deeper the sleep state the CPU enters, the longer it takes to wake up and send instructions to the GPU. With wake times being measures in fractions of a millisecond, those wake times can have a measurable impact on the frames per second that can be rendered by the GPU.

The present disclosure describes a technique for limiting the sleep states rather than eliminating or disabling the ability of the CPU to sleep (e.g., by disabling all of the sleep states). The elimination of CPU sleep states (e.g., having the GPU veto sleep state calls from the CPU to prevent the CPU from entering any sleep state) causes increased power consumption that can sap limited battery life, and can have negative consequences for the CPU operation capabilities For example, when INTEL® CPUs recognize that performance/sleep states have been disabled, they limit their top turbo frequency to the multi-core turbo limit rather than allowing any one core to be driven to its top turbo frequency rating, which can have very negative performance ramifications for single and lightly threaded applications (e.g., some CPU SKUs (particularly mobile SKUs) will reduce their frequency by as much as 1 GHz.) As such, the dynamic and adaptive GPU-activity performance/sleep state modifications described herein provide an inexpensive but powerful solution that enables increases in graphics processing capabilities without the need for component upgrades.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A modified sleep state graphics processing system, comprising:
   a graphics processing system;
   a central processing system that is coupled to the graphics processing system and that is configured to enter a plurality of different sleep states; and
   a power management engine that is coupled to the graphics processing system and the central processing system, wherein the power management engine is configured to:
      determine that the graphics processing system is operating above a graphics processing activity threshold;
      detect a connection to an external power supply;
      prevent, in response to determining that the graphics processing system is operating above the graphics processing activity threshold and detecting the connection to the external power supply, the central processing system from entering a first subset of the plurality of different sleep states, wherein the central processing system is configured to communicate with the graphics processing system to cause the graphics processing system to render graphics while prevented from entering the first subset of the plurality of different sleep states;
      determine that the graphics processing system is operating below the graphics processing activity threshold; and
      allow, in response to determining that the graphics processing system is operating below the graphics processing activity threshold, the central processing system to enter the first subset of the plurality of different sleep states.

2. The system of claim 1, wherein the power management engine is configured to:
   allow the central processing system to enter a second subset of the plurality of different sleep states while preventing the central processing system from entering the first subset of the plurality of different sleep states; and
   cause the central processing system to transition from the second subset of the plurality of different sleep states to an operating state in order to communicate with the graphics processing system to cause the graphics processing system to render graphics.

3. The system of claim 2, wherein the second subset of the plurality of different sleep states is a C1 sleep state defined by the Advanced Configuration and Power Interface (ACPI) standard.

4. The system of claim 2, wherein the second subset of the plurality of different sleep states are associated with a latency variability that is lower than the first subset of the plurality of different sleep states.

5. The system of claim 1, wherein the determining that the graphics processing system is operating above the graphics processing activity threshold includes at least one of:
   determining that a graphics processing system temperature of the graphics processing system is above a temperature threshold;
   determining that a graphics processing system power consumption of the graphics processing system is above a power consumption threshold; and
   determining that a graphics processing system utilization of the graphics processing system is above a utilization threshold.

6. The system of claim 1, wherein the determining that the graphics processing system is operating above the graphics processing activity threshold includes determining that the graphics processing system has rendered graphics within a time period, and wherein the determining that the graphics processing system is operating below the graphics processing activity threshold includes determining that the graphics processing system has not rendered graphics within the time period.

7. An Information Handling System (IHS), comprising:
   a processing system; and
   a memory system that is coupled to the processing system and that includes instructions that, when executed by the processing system, cause the processing system to:
      determine that a Graphics Processing Unit (GPU) is operating above a GPU activity threshold;
      detect a connection to an external power supply;
      prevent, in response to determining that the GPU is operating above the GPU activity threshold and detecting the connection to the external power supply, a Central Processing Unit (CPU) from entering a first subset of a plurality of different sleep states available to the CPU, wherein the CPU communicates with the GPU to cause the GPU to render graphics while prevented from entering the first subset of the plurality of different sleep states;
      determine that the GPU is operating below the GPU activity threshold; and
      allow, in response to determining that the GPU is operating below the GPU activity threshold, the CPU to enter the first subset of the plurality of different sleep states.

8. The IHS of claim 7, wherein the instructions, when executed by the processing system, cause the processing system to:
   allow the CPU to enter a second subset of the plurality of different sleep states while preventing the CPU from entering the first subset of the plurality of different sleep states; and
   cause the CPU to transition from the second subset of the plurality of different sleep states to an operating state in order to communicate with the GPU to cause the GPU to render graphics.

9. The IHS of claim 8, wherein the second subset of the plurality of different sleep states is a C1 sleep state defined by the Advanced Configuration and Power Interface (ACPI) standard.

10. The IHS of claim 8, wherein the second subset of the plurality of different sleep states are associated with a latency variability that is lower than the first subset of the plurality of different sleep states.

11. The IHS of claim 7, wherein the determining that the GPU is operating above the GPU activity threshold includes determining that the GPU has rendered graphics within a time period, and wherein the determining that the GPU is operating below the GPU activity threshold includes determining that the GPU has not rendered graphics within the time period.

12. A method for providing modified sleep state graphic processing, comprising:
   determining, by a power management engine, that a graphics processing system is operating above a graphics processing activity threshold;
   preventing, by the power management engine in response to determining that the graphics processing system is operating above the graphics processing activity threshold and detecting the connection to the external power supply, a central processing system from entering a first subset of the plurality of different sleep states, wherein the central processing system is configured to communicate with the graphics processing system to cause the graphics processing system to render graphics while prevented from entering the first subset of the plurality of different sleep states;

determining, by the power management engine, that the graphics processing system is operating below the graphics processing activity threshold; and allowing, by the power management engine in response to determining that the graphics processing system is operating below the graphics processing activity threshold, the central processing system to enter the first subset of the plurality of different sleep states.

13. The method of claim 12, further comprising:

allowing, by the power management engine, the central processing system to enter a second subset of the plurality of different sleep states while preventing the central processing system from entering the first subset of the plurality of different sleep states; and causing, by the power management engine, the central processing system to transition from the second subset of the plurality of different sleep states to an operating state in order to communicate with the graphics processing system to cause the graphics processing system to render graphics.

14. The method of claim 13, wherein the second subset of the plurality of different sleep states is a C1 sleep state defined by the Advanced Configuration and Power Interface (ACPI) standard.

15. The method of claim 13, wherein the second subset of the plurality of different sleep states are associated with a latency variability that is lower than the first subset of the plurality of different sleep states.

16. The method of claim 12, wherein the determining that the graphics processing system is operating above the graphics processing activity threshold includes at least one of:

determining that a graphics processing system temperature of the graphics processing system is above a temperature threshold;

determining that a graphics processing system power consumption of the graphics processing system is above a power consumption threshold; and determining that a graphics processing system utilization of the graphics processing system is above a utilization threshold.

17. The method of claim 12, wherein the determining that the graphics processing system is operating above the graphics processing activity threshold includes determining that the graphics processing system has rendered graphics within a time period, and wherein the determining that the graphics processing system is operating below the graphics processing activity threshold includes determining that the graphics processing system has not rendered graphics within the time period.

* * * * *

UNITED STATES PATENT AND TRADEMARK OFFICE
CERTIFICATE OF CORRECTION

PATENT NO. : 10,545,568 B2  
APPLICATION NO. : 15/881451  
DATED : January 28, 2020  
INVENTOR(S) : Shows et al.

Page 1 of 1

It is certified that error appears in the above-identified patent and that said Letters Patent is hereby corrected as shown below:

On the Title Page

Applicant: "Dekll Products L.P" should read --Dell Products L.P.--.

In the Claims

Claim 12, Column 16, Line 63, insert the following text after "threshold;"
--detecting, by the power management engine, a connection to an external power supply;--.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*